United States Patent
Newman et al.

(10) Patent No.: US 11,025,665 B2
(45) Date of Patent: *Jun. 1, 2021

(54) DETECTION AND IDENTIFICATION OF TARGETED ATTACKS ON A COMPUTING SYSTEM

(71) Applicant: Microsoft Technology Licensing, LLC, Redmond, WA (US)

(72) Inventors: Philip K. Newman, Seattle, WA (US); Puhazholi Vetrivel, Redmond, WA (US); Sudhakar Narayanamurthy, Redmond, WA (US); Ejike E. Ofuonye, Redmond, WA (US); Suresh C. Palani, Sammamish, WA (US); Ashish Mishra, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/895,608

(22) Filed: Jun. 8, 2020

(65) Prior Publication Data

US 2020/0304538 A1 Sep. 24, 2020

Related U.S. Application Data

(63) Continuation of application No. 15/874,983, filed on Jan. 19, 2018, now Pat. No. 10,715,545.

(60) Provisional application No. 62/561,966, filed on Sep. 22, 2017.

(51) Int. Cl.
*H04L 29/06* (2006.01)
*G06F 21/57* (2013.01)
*G06F 21/56* (2013.01)
*G06F 21/55* (2013.01)

(52) U.S. Cl.
CPC .......... *H04L 63/1441* (2013.01); *G06F 21/55* (2013.01); *G06F 21/56* (2013.01); *G06F 21/566* (2013.01); *G06F 21/577* (2013.01); *H04L 63/0236* (2013.01); *H04L 63/14* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| 8,997,226 B1* | 3/2015 | Call | H04L 63/1416 726/22 |
| 9,009,828 B1* | 4/2015 | Ramsey | G06F 16/24575 726/23 |
| 9,185,119 B1* | 11/2015 | Tamersoy | H04L 63/14 |

(Continued)

*Primary Examiner* — Michael Pyzocha
(74) *Attorney, Agent, or Firm* — Christopher J. Volkmann; Kelly, Holt & Christenson, PLLC (57) ABSTRACT

Malicious activity data is obtained, that is indicative of attempted attacks on a computing system. Clusters of targets are identified and it is determined whether the malicious activity preferentially targets one cluster of targets over other. Also, low prevalence attacks are identified and it is determined whether a low prevalence attack has a high concentration in one or more of the target clusters. If the malicious activity either preferentially targets a cluster, or a low prevalence attack has a high concentration in a cluster, then the attack is identified as a targeted attack, so that remediation steps can be taken.

21 Claims, 8 Drawing Sheets

(56) References Cited

U.S. PATENT DOCUMENTS

| | | | |
|---|---|---|---|
| 9,774,619 B1* | 9/2017 | Radlein | H04L 63/1458 |
| 10,104,097 B1* | 10/2018 | Yumer | G06F 21/554 |
| 10,121,000 B1* | 11/2018 | Rivlin | G06F 21/552 |
| 10,178,109 B1* | 1/2019 | Miskovic | H04L 63/1416 |
| 10,320,820 B2* | 6/2019 | Lord | H04L 63/145 |
| 10,452,841 B1* | 10/2019 | Tamersoy | G06N 5/04 |
| 2013/0246423 A1* | 9/2013 | Bhargava | H04L 63/145 |
| | | | 707/737 |
| 2014/0215616 A1* | 7/2014 | Bhatt | G06F 21/554 |
| | | | 726/23 |
| 2015/0163121 A1* | 6/2015 | Mahaffey | H04W 12/12 |
| | | | 707/687 |
| 2015/0163242 A1* | 6/2015 | Laidlaw | G06N 7/023 |
| | | | 726/22 |
| 2015/0207813 A1* | 7/2015 | Reybok | H04L 63/145 |
| | | | 726/22 |
| 2015/0237068 A1* | 8/2015 | Sandke | H04L 63/1425 |
| | | | 726/23 |
| 2016/0080398 A1* | 3/2016 | Yablokov | H04L 63/1416 |
| | | | 726/23 |
| 2016/0094565 A1* | 3/2016 | Adams | H04L 63/145 |
| | | | 726/24 |
| 2016/0103992 A1* | 4/2016 | Roundy | G06F 21/554 |
| | | | 726/23 |
| 2016/0134651 A1* | 5/2016 | Hu | H04L 63/1425 |
| | | | 726/23 |
| 2016/0232358 A1* | 8/2016 | Grieco | G06F 21/577 |
| 2017/0171231 A1* | 6/2017 | Reybok, Jr. | G06F 16/23 |
| 2018/0167407 A1* | 6/2018 | Ikeda | H04L 47/2441 |
| 2018/0295149 A1* | 10/2018 | Gazit | H04L 63/1416 |
| 2018/0307832 A1* | 10/2018 | Ijiro | H04L 63/1416 |
| 2020/0074327 A1* | 3/2020 | Yamamoto | G06F 16/285 |

\* cited by examiner

DETECTION AND IDENTIFICATION OF TARGETED ATTACKS ON A COMPUTING SYSTEM

CROSS-REFERENCE TO RELATED APPLICATIONS

The present application is a continuation of and claims priority of U.S. patent application Ser. No. 15/874,983, filed Jan. 19, 2018, and is based on and claims the benefit of U.S. provisional patent application Ser. No. 62/561,966, filed Sep. 22, 2017, the contents of which are hereby incorporated by reference in their entirety.

BACKGROUND

Computing systems are currently in wide use. Some computing systems are deployed as data centers, or to host services for a plurality of different users, among other things.

It is not uncommon for an individual or an organization to attempt to gain access to a computing system which they are not authorized to access, and to then perform some type of malicious activity on that computing system. In fact, for many large organizations, such attacks and malware are nearly a day-to-day occurrence.

In order to combat these attacks, most organizations have basic anti-malware and security mechanisms in place. These mechanisms work relatively well for attacks that are sometimes referred to as commodity attacks. Commodity attacks are often launched by attackers who are attempting to attack targets, in general, without having a particular target as a focus of interest. However, these mechanisms do not work as well for identifying and interrupting more targeted attacks, where an attacker has a specific organization or an individual or group within that organization, as a target of an attack. This is often because such an attacker continues to gain knowledge and to change tactics based on that knowledge. For instance, such attacks may move from an attack on a company e-mail system to an attack through social media, etc.

The discussion above is merely provided for general background information and is not intended to be used as an aid in determining the scope of the claimed subject matter.

SUMMARY

Malicious activity data is obtained, that is indicative of attempted attacks on a computing system. Clusters of targets are identified and it is determined whether the malicious activity preferentially targets one cluster of targets or a set of clusters, over others. Also, low prevalence attacks are identified and it is determined whether a low prevalence attack has a high concentration in one or more of the target clusters. If the malicious activity either preferentially targets a cluster, or a low prevalence attack has a high concentration in a cluster, then the attack is identified as a targeted attack, so that remediation steps can be taken.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
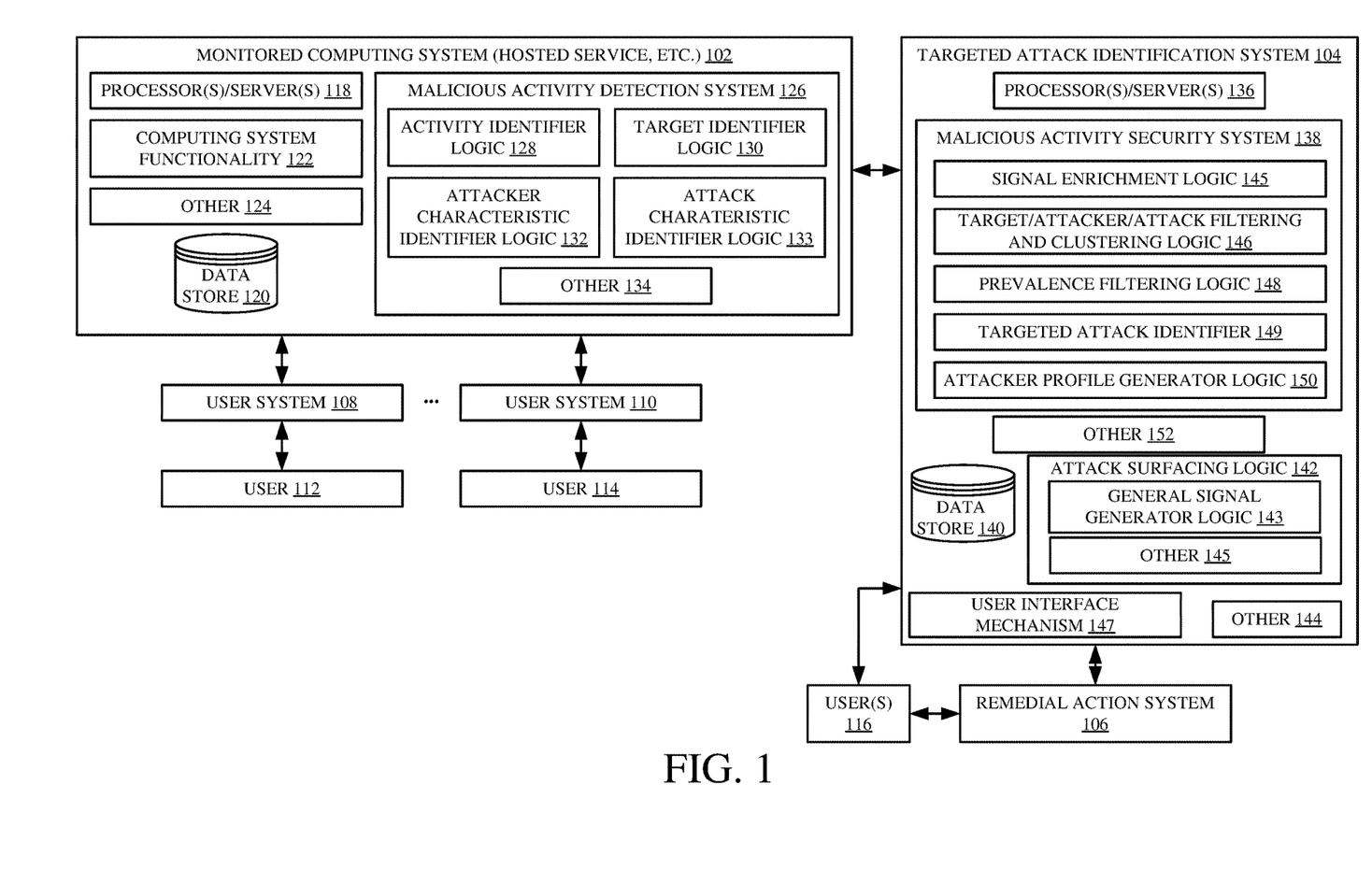
FIG. 1 is a block diagram of one example of a computing system architecture.

FIG. 1 is a block diagram of one example of a computing system architecture 100 which includes a monitored computing system 102 (that may be a hosted service or another computing system), a targeted attack identifying system 104, and remedial action system 106. FIG. 1 also shows that, in one example, monitored computing system 102 can be accessed by user systems 108-110 so that users 112-114 can access monitored computing system 102 through their user computing systems 108-110, respectively.

In addition, FIG. 1 shows that a user 116 (which may be an administrative user, an on-call engineer, or another attack responder), may have access to either targeted attack identification system 104 or remedial action system 106, or both. In general, targeted attack identification system 104 receives malicious activity data indicative of malicious activity that has been taken with respect to monitored computing system 102. It identifies whether the malicious activity represents a targeted attack on computing system 102 and, if so, surfaces that information for user 116. User 116 can then access remedial action system 106 to take remedial action to inhibit the attack from continuing, to inhibit future targeted attacks, etc. Control signals can also be generated so system 104 can automatically control system 106 to take remedial action.

Before describing the overall operation of architecture 100 in more detail, a brief description of some of the items in architecture 100, and their operation, will first be provided. Monitored computing system 102 may be a computing system that hosts a service for users 112-114, it may be a data center, or it may be another monitored computing system. It illustratively includes one or more processors or servers 118, a data store 120, a wide variety of different computing system functionality 122, which will vary based upon the type of computing system, and it can include a wide variety of other items 124.

Computing system 102 also illustratively includes malicious activity detection system 126 which, itself, can include activity identifier logic 128, target identifier logic 130, attacker characteristic identifier logic 132, attack characteristic identifier logic 133, and it can include other items 134. Activity identifier logic 128 may be a model or a dynamic system that identifies activities or events that take place on monitored computing system 102 and that determines whether it is malicious activity. The output of activity identifier logic 128 may include an activity identifier that identifies the activity or sequence of steps or events that are considered to be malicious, an indication that they were indeed found to be malicious, and a confidence score that identifies the confidence that logic 128 has in its identification of the activity as being malicious.

Target identifier logic 130 illustratively identifies the target of the malicious activity. For instance, if the malicious activity was incorporated into one or more e-mail messages, then target identifier logic 130 illustratively identifies the recipient or recipients of the e-mail message(s). It may also identify other characteristics of the target, such as the role that the target plays in an organization that uses monitored computing system 102, a department where that user resides, a physical location of the user, the recipient domain and any recipient labels, among other things.

Attacker characteristic identifier logic 132 illustratively identifies a plurality of different characteristics of the attacker. Again, for instance, where the attack was incorporated in an e-mail message, it may identify the sender of the e-mail message, the sender domain, the sender IP address, and/or IP range, the sender country and location, etc.

Attack characteristic identifier logic 133 may also illustratively identify different characteristics of the attack. For instance, it may identify the subject in the Re: line of an e-mail message. It may specifically identify characteristics of the e-mail message (such as changing an O in an email address line or URL to a zero or similar deceptive characteristics, URLs in the e-mail, attachment hashes in the e-mail, original recipients in the e-mail, any malware families tagged to the e-mail, a determination as to whether the e-mail was a phishing e-mail or a spam e-mail, among a wide variety of other things). Attack characteristic identifier logic 133 can also cluster the attacks (or malicious activity) based on the characteristics it identifies. This can be done by other logic as well.

When malicious activity detection system 126 identifies any malicious activity, it illustratively sends it, along with other information it has obtained or generated, to targeted attack identification system 104. System 104 determines whether the malicious activity represents a targeted attack.

Targeted attack identification system 104 illustratively includes one or more processors or servers 136, malicious activity security system 138, a data store 140, attack surfacing logic 142 (which, itself, can include control signal generation logic 143 and other items 145), user interface mechanism 147, and it can include a wide variety of other items 144. Malicious activity security system 138, itself, illustratively includes signal enrichment logic 145, target/attacker/attack filtering and clustering logic 146 (hereinafter referred to as clustering logic 146), prevalence filtering logic 148, targeted attack identifier logic 149, attacker profile generator logic 150, and it can include a wide variety of other items 152. Malicious activity security system 138 illustratively parses and filters the malicious activity information in certain ways so it can determine whether it represents a targeted attack.

Signal enrichment logic 145 receives the malicious activity signals indicative of malicious activity on monitored computing system 102 and enriches them with enrichment properties that can be used for clustering. The enrichment properties can include, for instance, target information identified by target identifier logic 130, attacker characteristics identified by logic 132 and attack characteristics identified by logic 133, among others.

Clustering logic 146 illustratively filters the malicious activity characteristics to generate target clusters which represent groups of users that are being targeted by the malicious activity. It can then refine the clusters, or generate other clusters, based upon the characteristics of the attacks leveled against those targets. The clusters of attacks that are generated based on the attack characteristics identified by logic 133 can be used for example, to refine the clusters to identify targets of different kinds of attacks. For instance, clustering logic 146 may refine the target clusters based on features of the payload or content of an e-mail message that was incorporated in the attack. This may result in groups or clusters that are separated out based on being targeted by different types of malicious activity. The clusters can then again be refined (or other clusters can be generated) by clustering logic 146 based upon the attacker features or characteristics identified by attacker characteristic identifier logic 132.

By way of example, assume that a research group in an organization is targeted by many attackers. The target clustering brings all of these attacks together to indicate that the research group is a target. The attacker clustering then refines this into multiple clusters or groups within the research department based upon the attacker information. For instance, there may be a sub-cluster or sub-group that is consistently targeted by a competitor. There may be another sub-cluster or sub-group that is consistently targeted by one or more bad actors. These are examples only.

Prevalence processing logic identifies the prevalence of an attack generally, across an entire tenant or organization or monitored computing system 102. It also identifies whether the attack has a relatively low prevalence (or frequency of activity) generally across the organization, tenant or monitored computing system 102 but has a high concentration within a single target or a group of targets. These types of targeted attacks can be difficult to detect. This is because they are relatively low prevalence, generally, so they are hard to identify. However, if they are targeted at a single target cluster or group of clusters, they may be identified as a targeted attack as well, even if they have a relatively low prevalence, relative to other attacks across the tenant, organization or computing system 102.

Attacker profile generator logic 150 illustratively begins generating an attacker profile using the attacker characteristics identified by attacker characteristic identifier logic 132, once an attack has been identified as a targeted attack. The attacker profile can be monitored to determine whether it changes over time, whether that particular attacker is increasing or decreasing the frequency of attack, etc.

Attack surfacing logic 142 illustratively uses control signal generator logic 143 to generate control signals that control system 104 to generate an output indicative of one or more targeted attacks that are identified by system 104. The output can have mechanisms that provide drilling capabilities so that a user can drill up into more abstract (or general) information or drill down into more detailed information about the targeted attack.

Once the targeted attack has been identified, then user 116 can invoke remedial action system 106. System 104 (e.g., control signal generator logic 143) can also generate additional control signals to control remedial action system 106 automatically. The remedial action system 106 illustratively takes remedial action based upon the identified targeted attack, the type of attack, the attacker profile, etc.

Figure 2A:
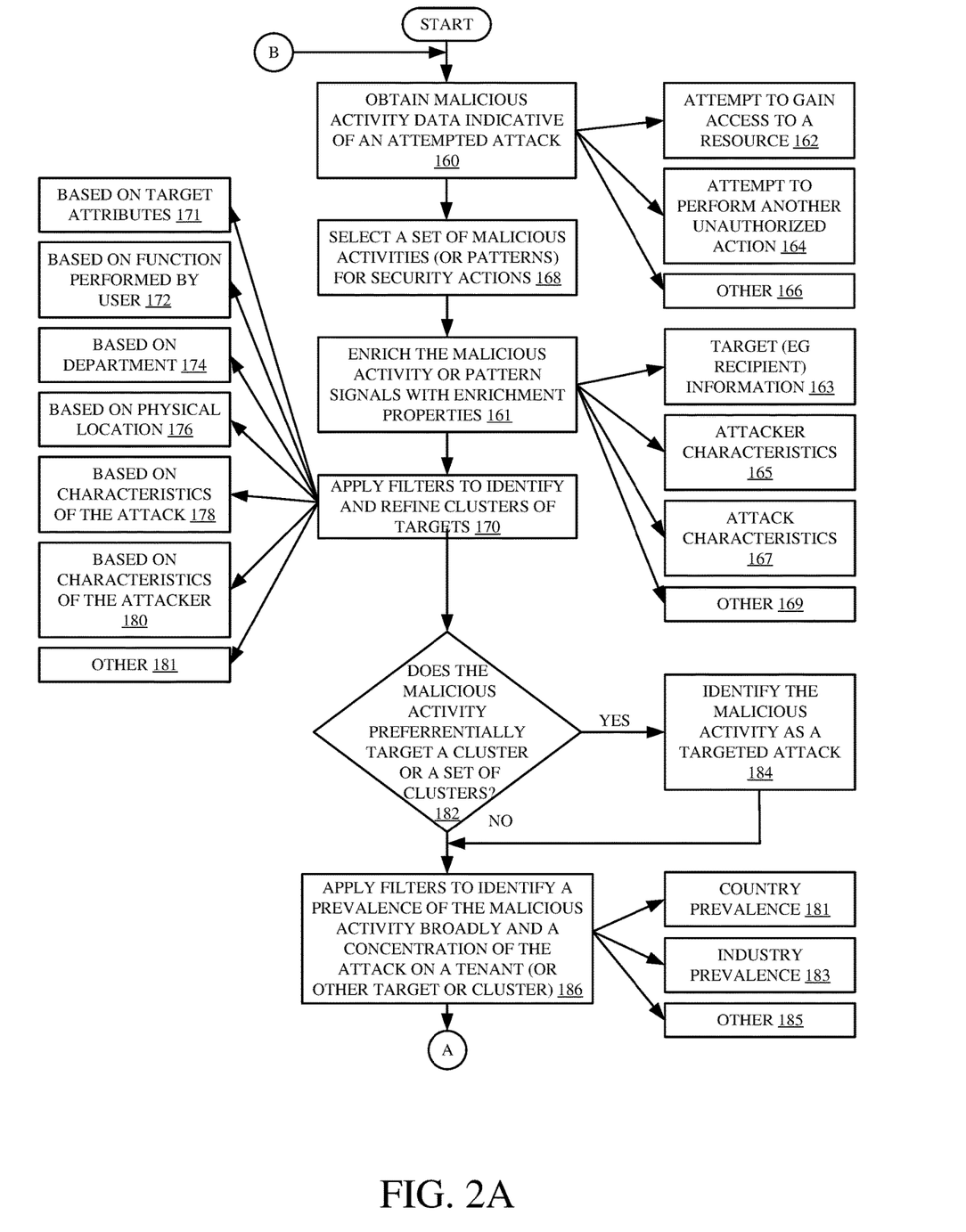
FIGS. 2A and 2B (collectively referred to herein as FIG. 2) illustrate a flow diagram showing one example of the operation of the architecture shown in FIG. 1, in identifying a targeted attack and obtaining information about the attacker so that remediation steps can be taken.
Figure 2B:
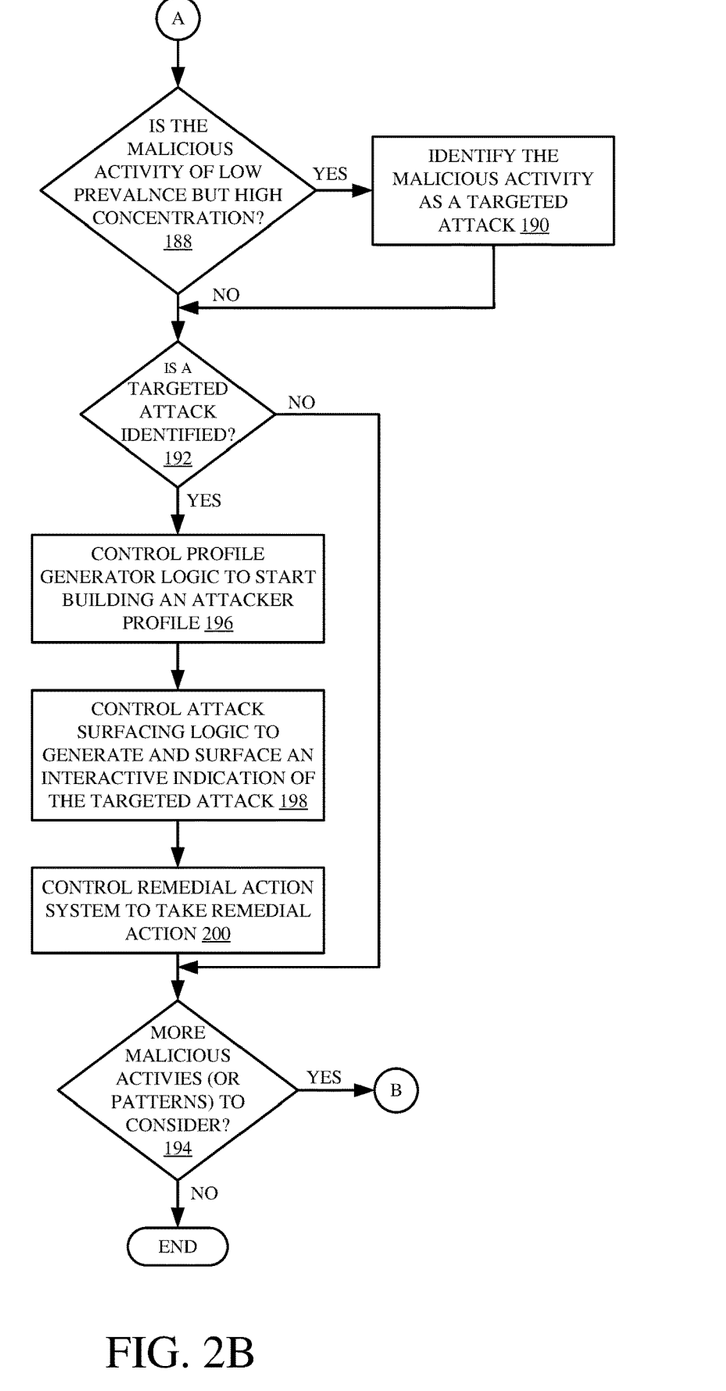

FIGS. 2A and 2B (collectively referred to herein as FIG. 2) illustrate a flow diagram showing one example of the operation of architecture 100 in identifying targeted attacks, generating an attacker profile, and controlling system 106 to take remedial action. It is first assumed that malicious activity analysis system 138 obtains malicious activity data indicative of an attempted attack or malicious activity from malicious activity detection system 126 in monitored computing system 102. Obtaining this information is indicated by block 160 in the flow diagram of FIG. 2. In one example, the malicious activity data indicates an attempt to gain access to a resource that the attacker is not authorized to access. This is indicated by block 162. The malicious activity data may be indicative of an attempt to perform another unauthorized action, or it may represent other attacks as well. This is indicated by blocks 164 and 166.

Malicious activity security system 138 then selects a set of malicious activity or a pattern (or signals representing the malicious activity or pattern) for security actions. This is indicated by block 168. Signal enrichment logic 145 then enriches those signals with enrichment properties, which can be used by clustering logic 146. This is indicated by block 161. The enrichment properties can include a wide variety of properties, such as target information 163 identified by logic 130, attacker characteristics 165 identified by logic 132, attack characteristics 167 identified by logic 133 and a wide variety of other characteristics 169. Some examples of the characteristics that can be used to enrich the malicious activity or pattern are described in more detail below.

Clustering logic 146 then identifies and refines clusters by applying filters based on the malicious activity signals and the enrichment properties. This is indicated by block 170. For instance, clustering logic 146 can generate clusters of targets by filtering the malicious activity signals and enrichment properties based on target attributes 163. This is indicated by block 171. The targets may be clustered by filtering based upon the function that the target performs for an organization, such as a tenant. This is indicated by block 172. By way of example, if the targeted user is in a research role, a financial role, etc., and signal enrichment logic has enriched the malicious activity or pattern signals with that information, then they may be filtered based on that information to generate clusters according to that role, or the function that the targets perform. The targets may be clustered by filtering based upon the department where the targets work, as indicated by block 174. They may be clustered based upon the physical location of the targets, or in other ways as indicated by block 176. Once the filters are applied and the targets are clustered, the clusters can further be defined into subsets or sub-clusters (or additional clusters can be generated) by applying filters to filter based upon the characteristics of the attack, as indicated by block 178, and based upon the characteristics of the attacker as indicated by block 180.

By way of example, when the targets are first filtered so they are clustered based upon the function, department, physical location, etc., of the targets of the attack, this will identify different groups of users that are being targeted. When the clusters are refined by applying filters to filter based upon the characteristics of the attack (such as payload features in an e-mail, or other characteristics of an attack) this separates the clusters out into different groups of users that are targeted by attacks having different characteristics. Then, the initial clusters and the sub-clusters can be further refined by applying filters to filter based upon the characteristics of the attacker. This will indicate whether an attacker having a set of characteristics is preferentially attacking one of the targeted groups or clusters.

Once clusters have been generated based on the attacks, attackers and targets, then targeted attack identifier 149 determines whether the malicious activity of an attacker or group of attackers, or whether attacks having similar characteristics, preferentially target a target cluster or a set of target clusters. This is indicated by block 182. If so, then the malicious activity can be identified as a targeted attack. This is indicated by block 184.

Prevalence filtering logic 148 can also apply time filters to identify a prevalence of the malicious activity broadly, as indicated by block 186. In one example, prevalence is represented by a number of attacks relative to a number of other attacks in the group being considered. For instance, assume that a malicious activity pattern has been identified as an attack. Prevalence filtering logic 148 can apply filters to determine whether the attack has been launched a relatively high number of times, relative to other attacks in a particular category. This is indicated by block 186. For instance, it can identify the prevalence of an attack on monitored computing system 102 across a country 181 (or other geographic region), across an industry 183 or across another broad prevalence category 185. Logic 148 can apply a concentration filter to identify whether there is a concentration of the malicious activity on a specific tenant, a cluster of tenants, or another cluster of targets.

Targeted attack identifier 149 then determines whether the malicious activity has a relatively low prevalence broadly but a relatively high concentration on a specific tenant or other target cluster. This is indicated by block 188. If so, then the malicious activity is identified as a targeted attack as well. This is indicated by block 190.

If no targeted attacks have been identified by identifier 149, as indicated by block 192, then processing skips to block 194 where it is determined whether there are any additional malicious activities or patterns to consider by target attack identification system 104. If so, processing reverts to block 160.

If, at block 192, a targeted attack has been identified by identifier 149, then system 104 controls attacker profile generator logic 150 to start building an attacker profile based upon the attacker characteristics identified by attacker characteristic identifier logic 132. Building an attacker profile is indicated by block 196 in the flow diagram of FIG. 2.

In addition, system 104 controls attack surfacing logic 142 to generate and surface an interactive indication of the targeted attack. This is indicated by block 198. For instance, control signal generator logic 143 can generate control signals to control user interface mechanism 147 to surface an interactive display that may be surfaced with drill actuators that can be used to drill up into less detailed or more general information about the attack, the attacker, the targets, other attacks, etc. It may also have one or more actuators to drill down into more detailed information about the targeted attack, about the attacker, about the targets, etc.

Also, system 104, or user 116 can then control remedial action system 106 in order to take remedial action. For example, control signal generator logic 143 can generate signals to control remedial action system 106 to automatically take action. This is indicated by block 200. The remedial action can be taken (automatically or by user 116) to stop or inhibit the targeted attack from continuing, to inhibit future targeted attacks by this attacker or a similar attacker, or an attacker using similar attack characteristics, or to perform other remedial actions.

It can thus be seen that the present system improves a computing system by greatly enhancing the security of the computing system by identifying targeted attacks which may otherwise go unidentified. It applies various filter criteria to identify target clusters and concentrations of relatively low prevalence attacks on small groups of targets. It then generates control signals to control output logic to generate and surface an output indicative of the targeted attacks so that remedial action can be taken.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion may have mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 3:
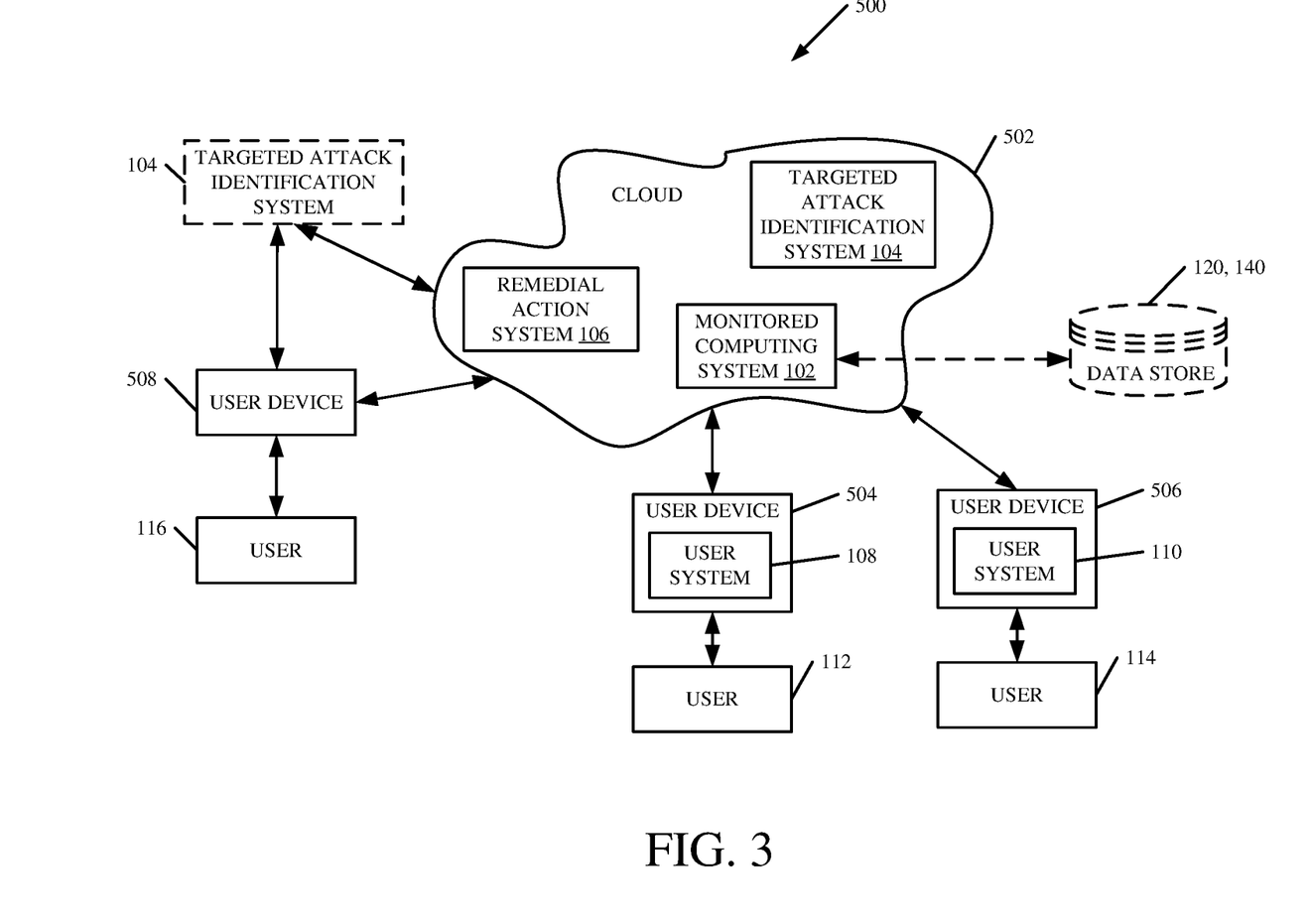
FIG. 3 is a block diagram showing the architecture illustrated in FIG. 1, deployed in a cloud computing architecture.

FIG. 3 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 3, some items are similar to those shown in FIG. 1 and they are similarly numbered. FIG. 3 specifically shows that monitored computing system 102, targeted attack identification system 104 and remedial action system 106 can be located in cloud 502 (which can be public, private, or a combination where portions are public while others are private). Therefore, users 108, 112, 114, and 116 use user devices 504, 506 and 508 to access those systems through cloud 502.

FIG. 3 also depicts another example of a cloud architecture. FIG. 3 shows that it is also contemplated that some elements of architecture 100 can be disposed in cloud 502 while others are not. By way of example, data stores 120, 140 can be disposed outside of cloud 502, and accessed through cloud 502. In another example, targeted attack identification system 104 (or other items) can be outside of cloud 502. Regardless of where they are located, they can be accessed directly by the appropriate user devices, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
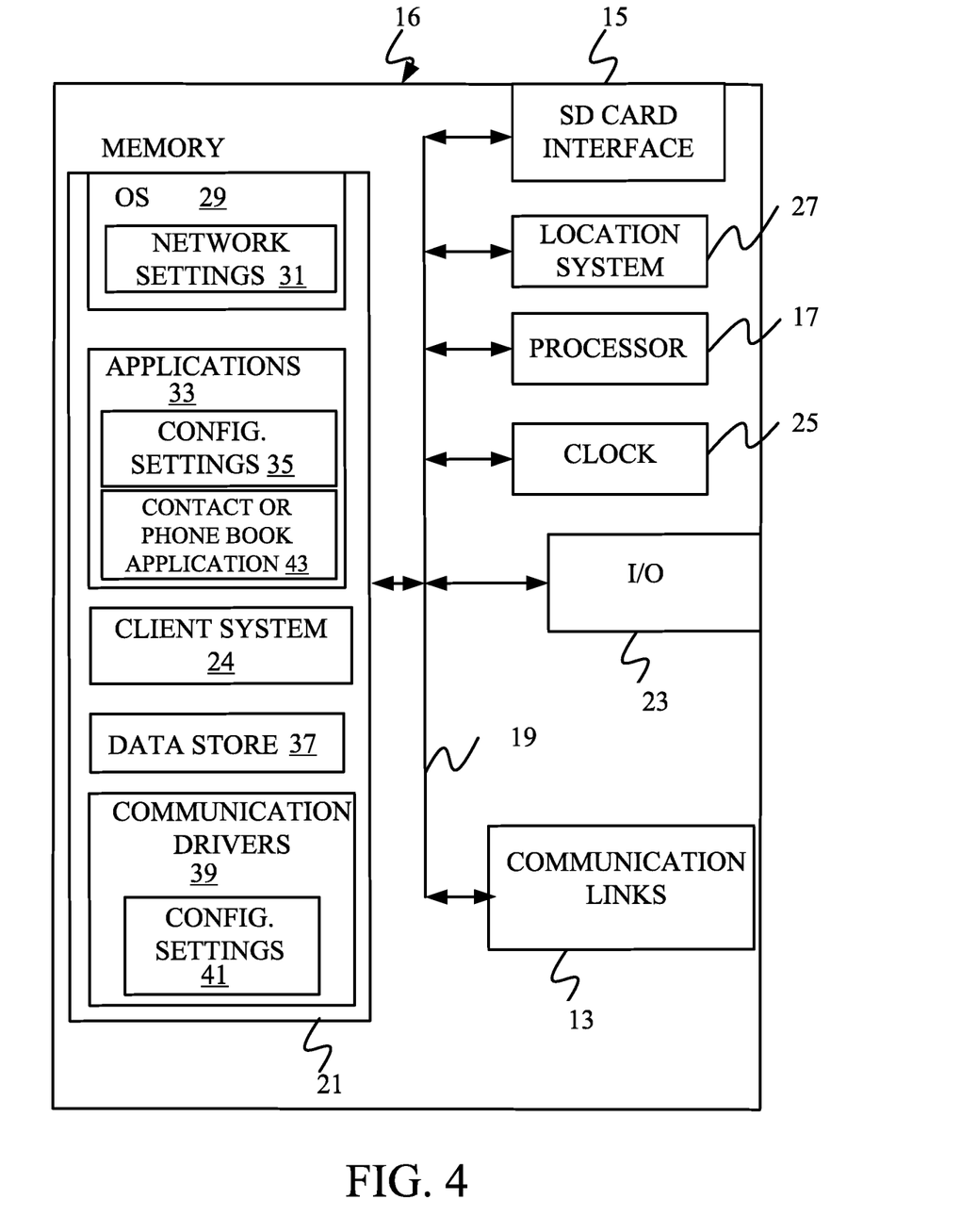
FIGS. 4-6 show examples of mobile devices that can be used in the architectures shown in the previous figures.
Figure 5:
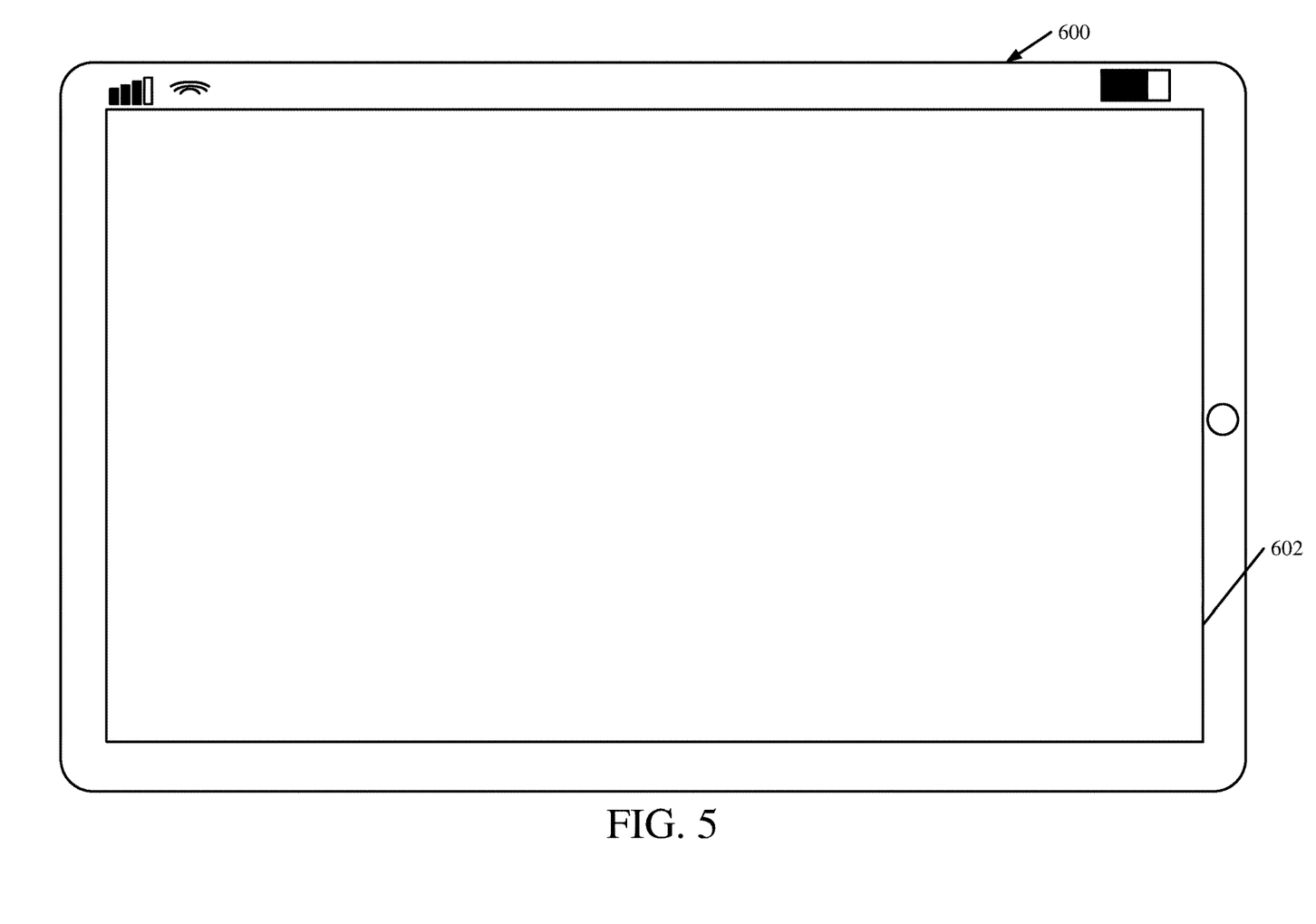
Figure 6:
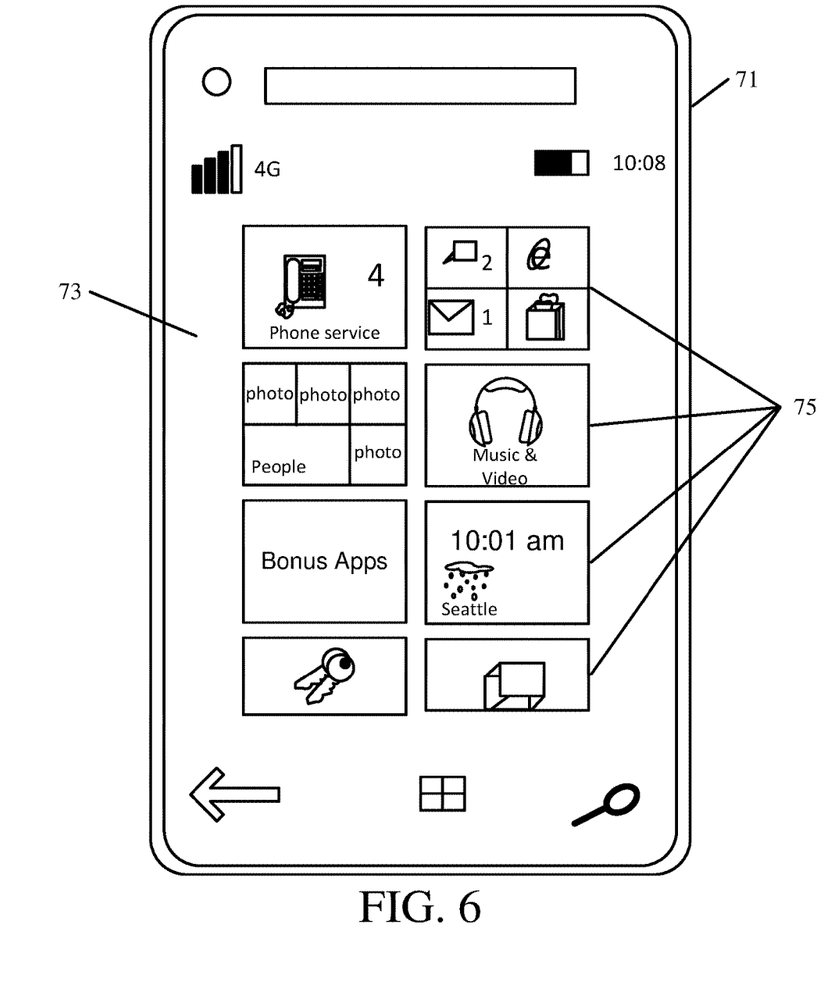

FIG. 4 is a simplified block diagram of one illustrative example of a handheld or mobile computing device that can be used as a user's or client's hand held device 16, in which the present system (or parts of it) can be deployed. FIGS. 5-6 are examples of handheld or mobile devices.

FIG. 4 provides a general block diagram of the components of a client device 16 that can run components architecture 100 or user devices 504, 506 and 508 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 5 shows one example in which device 16 is a tablet computer 600. In FIG. 5, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 6 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 7:
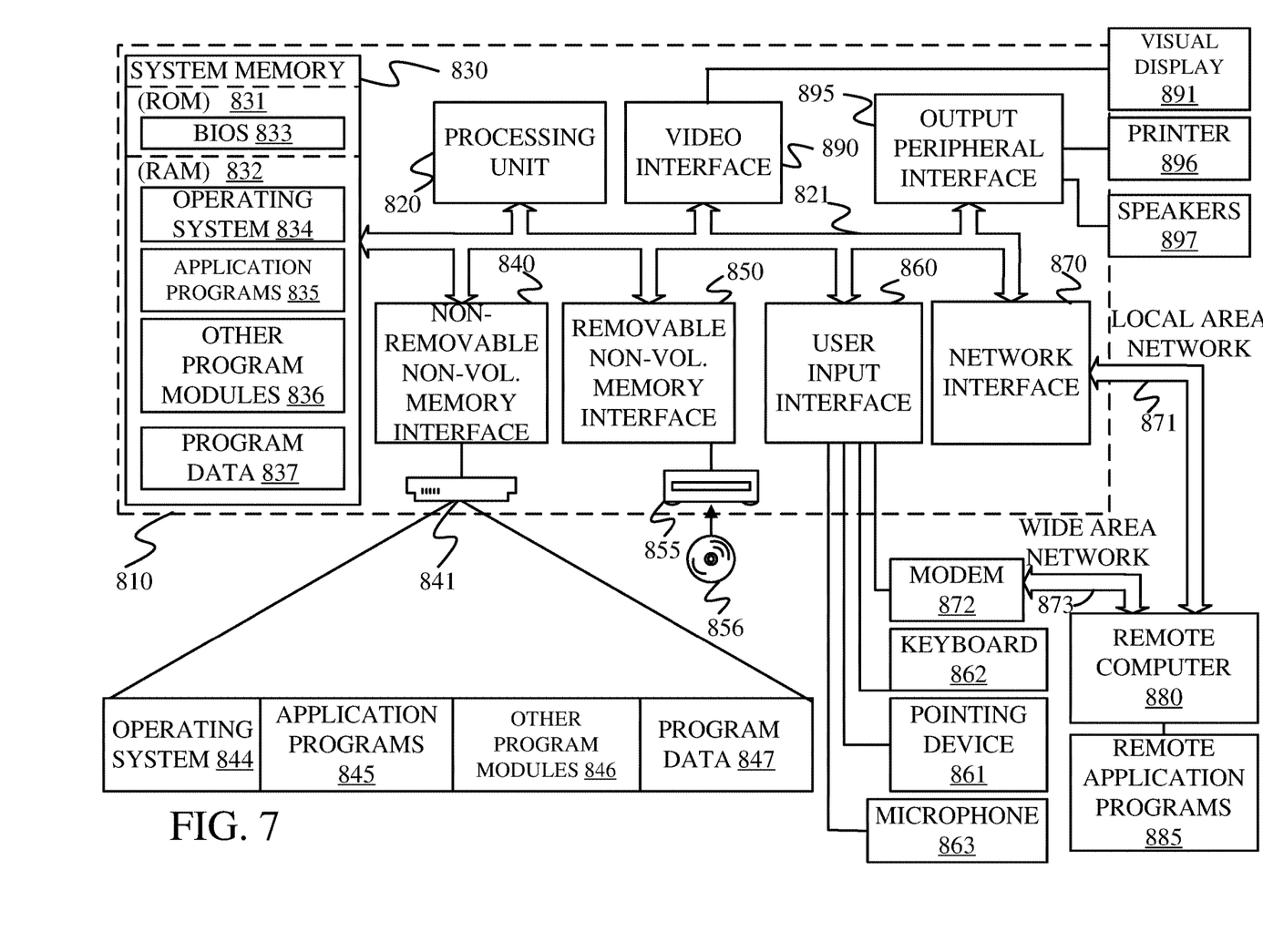
FIG. 7 is a block diagram showing one example of a computing environment that can be used in the architectures shown in the previous figures.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

target filtering logic that receives attack data indicative of malicious activity on a monitored computing system and applies a target filter to the attack data to cluster the attack data based on attack targets;

a malicious activity security system that identifies the malicious activity as a targeted attack if the malicious activity preferentially attacks a target cluster, and that obtains attack characteristics indicative of the targeted attack and attacker characteristics indicative of an identity of an attacker corresponding to the targeted attack; and control signal generator logic that controls a user interface mechanism to generate an interactive indication of the targeted attack including the attack characteristics and the attacker characteristics.

Example 2 is the computing system of any or all previous examples and further comprising:

signal enrichment logic configured to obtain enrichment properties corresponding to the attack data, the enrichment properties being indicative of characteristics of the attack targets, the signal enrichment logic being configured to add the enrichment properties to the attack data so the target filtering logic can apply the target filter to cluster the attack data based on the attack targets.

Example 3 is the computing system of any or all previous example wherein the signal enrichment logic is configured to further obtain, as the enrichment properties corresponding to the attack data, the attack characteristics being indicative of characteristics of the malicious activity.

Example 4 is the computing system of any or all previous example wherein the signal enrichment logic is configured to further obtain, as the enrichment properties corresponding to the attack data, the attacker characteristics indicative of an identity of the attacker.

Example 5 is the computing system of any or all previous example and further comprising:

attacker filtering logic that receives the enrichment properties including the attacker characteristics and to apply an attacker filter to the attack data and the enrichment properties to cluster the attack data based on the attacker characteristics.

Example 6 is the computing system of any or all previous example and further comprising:

attack filtering logic that receives the enrichment properties including the attack characteristics and to apply an attack filter to the attack data and the enrichment properties to cluster the attack data based on the attack characteristics.

Example 7 is the computing system of any or all previous example wherein the malicious activity security system comprises:

prevalence filtering logic configured to apply a prevalence filter to the attack data and enrichment properties to determine whether the malicious activity has a relatively low prevalence, relative to other malicious activity, across users of the monitored computing system and a relative high prevalence, relative to an amount of the malicious activity, on a target cluster and, if so, to identify the malicious activity as a targeted attack.

Example 8 is the computing system of any or all previous example wherein the signal enrichment logic is configured to obtain, as the enrichment properties indicative of the characteristics of the attack targets, role data indicative of a function performed by the attack targets, the target filtering logic being configured to apply the target filter to cluster the attack data based on the role data corresponding to the attack targets.

Example 9 is the computing system of any or all previous example wherein the signal enrichment logic is configured to obtain, as the enrichment properties indicative of the characteristics of the attack targets, geographic location data indicative of a geographic location of the attack targets, the target filtering logic being configured to apply the target filter to cluster the attack data based on the geographic location data corresponding to the attack targets.

Example 10 is the computing system of any or all previous example wherein the signal enrichment logic is configured to obtain, as the enrichment properties indicative of the characteristics of the attack targets, department data indicative of a department where the attack targets reside, the target filtering logic being configured to apply the target filter to cluster the attack data based on the department data corresponding to the attack targets.

Example 11 is a computer implemented method, comprising:

receiving attack data indicative of malicious activity on a monitored computing system;

applying a target filter to the attack data to cluster the attack data based on attack targets;

identifying the malicious activity as a targeted attack if the malicious activity preferentially attacks a target cluster;

if the malicious activity is identified as a targeted attack, then obtaining attack characteristics indicative of the targeted attack and obtaining attacker characteristics indicative of an identity of an attacker corresponding to the targeted attack; and controlling a user interface mechanism to generate an interactive indication of the targeted attack including the attack characteristics and the attacker characteristics.

Example 12 is the computer implemented method of any or all previous example and further comprising:

identifying enrichment properties corresponding to the attack data, the enrichment properties being indicative of characteristics of the attack targets; and adding the enrichment properties to the attack data so the target filter can be applied to cluster the attack data based on the attack targets.

Example 13 is the computer implemented method of any or all previous example and further comprising:

identifying, as the enrichment properties corresponding to the attack data, the attack characteristics indicative of characteristics of the malicious activity.

Example 14 is the computer implemented method of any or all previous example and further comprising:

identifying, as the enrichment properties corresponding to the attack data, the attacker characteristics indicative of an identity of the attacker.

Example 15 is the computer implemented method of any or all previous example and further comprising:

applying an attacker filter to the attack data and the enrichment properties to cluster the attack data based on the attacker characteristics; and applying an attack filter to the attack data and the enrichment properties to cluster the attack data based on the attack characteristics.

Example 16 is the computer implemented method of any or all previous example wherein identifying the malicious activity as a targeted attack comprises:

applying a prevalence filter to the attack data and enrichment properties to determine whether the malicious activity has a relatively low prevalence, relative to other malicious activity, across users of the monitored computing system and a relative high prevalence, relative to an amount of the malicious activity, on a target cluster; and if so, identifying the malicious activity as a targeted attack.

Example 17 is the computer implemented method of any or all previous example wherein identifying enrichment properties comprises:

identifying, as the enrichment properties indicative of the characteristics of the attack targets, role data indicative of a function performed by the attack targets, and wherein applying a target filter comprises applying the target filter to cluster the attack data based on the role data corresponding to the attack targets.

Example 18 is the computer implemented method of any or all previous example wherein identifying enrichment properties comprises:

identifying, as the enrichment properties indicative of the characteristics of the attack targets, geographic location data indicative of a geographic location of the attack targets, and wherein applying the target filter comprises applying the target filter to cluster the attack data based on the geographic location data corresponding to the attack targets.

Example 19 is the computer implemented method of any or all previous example wherein identifying enrichment properties comprises:

identifying, as the enrichment properties indicative of the characteristics of the attack targets, department data indicative of a department where the attack targets reside, and wherein applying the target filter comprises applying the target filter to cluster the attack data based on the department data corresponding to the attack targets.

Example 20 is a computing system, comprising:

signal enrichment logic configured to receive attack data indicative of malicious activity on a monitored computing system and to obtain enrichment properties corresponding to the attack data, the enrichment properties being indicative of characteristics of attack targets, the signal enrichment logic being configured to add the enrichment properties to the attack data;

target filtering logic that applies a target filter to the attack data and the enrichment properties to cluster the attack data based on attack targets;

a malicious activity security system that identifies the malicious activity as a targeted attack if the malicious activity preferentially attacks a target cluster, and that obtains attack characteristics indicative of the targeted attack and attacker characteristics indicative of an identity of an attacker corresponding to the targeted attack; and control signal generator logic that controls a user interface mechanism to generate an interactive indication of the targeted attack including the attack characteristics and the attacker characteristics.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    receiving attack data that includes object identifiers and represents activity corresponding to the object identifiers on a monitored computing system;
    applying a target filter to the attack data based on the object identifiers;
    identifying a set of target clusters based on the application of the target filter, each target cluster being associated with at least one object identifier and representing a target of the activity represented by the attack data;
    determining that the activity has a higher attack frequency on a particular target cluster compared to at least one other target cluster;
    identifying a targeted attack based on the determination;
    obtaining an attack characteristic indicative of the identified targeted attack;
    obtaining an attacker characteristic indicative of an identity of an attacker corresponding to the identified targeted attack; and
    performing a remedial action based on the attack characteristic and the attacker characteristic.

2. The computer-implemented method of claim 1, wherein performing the remedial action comprises inhibiting the targeted attack.

3. The computer-implemented method of claim 1, wherein performing the remedial action comprises inhibiting a future targeted attack.

4. The computer-implemented method of claim 1, wherein performing the remedial action comprises instructing a display device to generate an indication of the targeted attack including the attack characteristic and the attacker characteristic.

5. The computer-implemented method of claim 1, and further comprising:
    determining that the attack data matches an activity pattern; and
    applying the target filter to the attack data based on the determination.

6. The computer-implemented method of claim 5, wherein the activity pattern models malicious activity, and further comprising:
    identifying the represented activity on the monitored computing system as malicious activity.

7. The computer-implemented method of claim 1, wherein the object identifiers identify objects corresponding to the activity on the monitored computing system.

8. The computer-implemented method of claim 1, wherein the particular target cluster comprises at least one of:
    a particular user,
    a particular group of users, or
    a particular computing resource.

9. The computer-implemented method of claim 1, and further comprising:
    obtaining an enrichment property corresponding to the attack data;
    adding the enrichment property to the attack data; and
    identifying the set of target clusters based on application of the target filter to the enrichment property.

10. The computer-implemented method of claim 9, wherein an enrichment property comprises:
    the attack characteristic indicative of a characteristic of the activity, or
    the attacker characteristic indicative of an identity of the attacker.

11. The computer-implemented method of claim 10, wherein the target filter includes an attacker filter and attack filter.

12. The computer-implemented method of claim 9, and further comprising:
    obtaining, as the enrichment property, at least one of:
        role data indicative of a function performed by an object identified by one or more of the object identifiers, or
        geographic location data indicative of a geographic location of the object; and
    applying the target filter to the attack data based on at least one of the role data or the geographic location data.

13. The computer-implemented method of claim 1, and further comprising:
    identifying a targeted attack on the particular target cluster based on a determination that the activity has
        a lower prevalence compared to other activity across users of the monitored computing system, and
        a higher prevalence compared to an amount of the activity on the target cluster.

14. A computing system comprising:
    at least one processor; and
    memory storing instructions executable by the at least one processor, wherein the instructions, when executed, cause the computing system to:
        receive attack data that includes object identifiers and represents activity corresponding to the object identifiers on a monitored computing system;
        apply a target filter to the attack data based on the object identifiers;
        identify a set of target clusters based on the application of the target filter, each target cluster being associated with at least one object identifier and representing a target of the activity represented by the attack data;
        determine that the activity has a lower prevalence compared to other activity across users of the monitored computing system, and a higher prevalence compared to an amount of the activity on a particular target cluster; and
        identify a targeted attack on the particular target cluster based on the determination;
        obtain an attack characteristic indicative of the targeted attack;
        obtain an attacker characteristic indicative of an identity of an attacker corresponding to the targeted attack; and
        perform a remedial action based on the attack characteristic and the attacker characteristic.

15. The computing system of claim 14, wherein the remedial action comprises at least one of:
    inhibiting the targeted attack,
    inhibiting a future targeted attack, or
    instructing a display device to generate an indication of the targeted attack including the attack characteristic and the attacker characteristic.

16. The computing system of claim 14, wherein the instructions, when executed, cause the computing system to:

determine that the attack data matches an activity pattern; and apply the target filter to the attack data based on the determination.

17. The computing system of claim 14, wherein the activity pattern models malicious activity, and the instructions, when executed, cause the computing system to:

identify the represented activity on the monitored computing system as malicious activity.

18. The computing system of claim 14, wherein the object identifiers identify objects corresponding to the activity on the monitored computing system.

19. The computing system of claim 14, wherein the particular target cluster comprises at least one of:
   a particular user,
   a particular group of users, or
   a particular computing resource.

20. A computer-implemented method comprising:
   receiving attack data that includes a target identifier and represents activity on a monitored computing system;
   obtaining an enrichment property corresponding to the attack data, the enrichment property being indicative of a characteristic associated with the target identifier; and
   adding the enrichment property to the attack data;
   applying a target filter to the attack data and the enrichment property;
   identifying a set of target clusters based on the application of the target filter, each target cluster being associated with at least one target identifier;
   determining that the activity has a higher attack frequency on a particular target cluster compared to at least one other target cluster;
   identifying a targeted attack based on the determination;
   obtaining an attack characteristic indicative of the targeted attack and an attacker characteristic indicative of an identity of an attacker corresponding to the targeted attack; and
   performing a remedial action, that corresponds to the targeted attack, based on the attack characteristic and the attacker characteristic.

21. The computer-implemented method of claim 20, wherein the remedial action comprises at least one of:
   inhibiting the targeted attack,
   inhibiting a future targeted attack, or
   instructing a display device to generate an indication of the targeted attack including the attack characteristic and the attacker characteristic.

\* \* \* \* \*